(12) United States Patent
Quinn

(10) Patent No.: US 8,231,791 B2
(45) Date of Patent: Jul. 31, 2012

(54) SYSTEM AND METHOD FOR CONTROLLING MULTIPLE SIZED WATER SOFTENING TANKS

(75) Inventor: Kerry Quinn, Palatine, IL (US)

(73) Assignee: Culligan International Company, Rosemont, IL (US)

( * ) Notice: Subject to any disclaimer, the term of this patent is extended or adjusted under 35 U.S.C. 154(b) by 50 days.

(21) Appl. No.: 12/687,279

(22) Filed: Jan. 14, 2010

(65) Prior Publication Data

US 2011/0168637 A1 Jul. 14, 2011

(51) Int. Cl.
*C02F 1/42* (2006.01)

(52) U.S. Cl. ......... 210/687; 210/97; 210/102; 210/134; 210/143; 210/264; 210/340; 210/739

(58) Field of Classification Search .................... 210/87, 210/97, 134, 143, 190, 191, 264, 269, 340, 210/102, 687, 739
See application file for complete search history.

(56) References Cited

U.S. PATENT DOCUMENTS

| | | | |
|---|---|---|---|
| 2,191,403 A * | 2/1940 | Tarbox et al. | 210/767 |
| 2,684,942 A * | 7/1954 | Tice | 210/140 |
| 4,162,973 A | 7/1979 | Lynch | |
| 4,468,318 A | 8/1984 | Le Dall | |
| 4,470,911 A | 9/1984 | Reinke | |
| 4,490,249 A | 12/1984 | Seal | |
| 5,331,619 A | 7/1994 | Barnum et al. | |
| 5,681,454 A | 10/1997 | Schenk | |
| 6,783,666 B2 | 8/2004 | Takeda et al. | |
| 2009/0090662 A1 | 4/2009 | Quinn | |

FOREIGN PATENT DOCUMENTS

| | | | | |
|---|---|---|---|---|
| JP | 59154118 A | * | 9/1984 | 210/134 |
| JP | 60248214 A | * | 12/1985 | 210/97 |
| WO | WO 93/00168 | | 1/1993 | |

OTHER PUBLICATIONS

Kenneth E. Heselton, Boiler Operator's Handbook, Jan. 2005, Fairmont Press Inc., p. 99.*
European Search Report dated Apr. 11, 2011 for Application No. EP 11 15 0890.

* cited by examiner

*Primary Examiner* — Matthew Savage
(74) *Attorney, Agent, or Firm* — Greer, Burns & Crain, Ltd.

(57) ABSTRACT

A water softening system including a first treatment tank having a first water capacity, a second treatment tank in parallel with the first treatment tank and having a second water capacity that is less than the first water capacity, a flow meter connected to the first and second treatment tanks, the flow meter configured to determine a demand flow rate of water entering the system and a controller in communication with the flow meter, the controller configured to direct the water into the first treatment tank when the demand flow rate is greater than a designated flow rate, and to direct the water into the second treatment tank when the demand flow rate is equal to or less than the designated flow rate.

14 Claims, 3 Drawing Sheets

SYSTEM AND METHOD FOR CONTROLLING MULTIPLE SIZED WATER SOFTENING TANKS

BACKGROUND

The present invention relates generally to fluid treatment systems, such as water treatment systems including water softeners, and more particularly to a system and method for controlling multiple sized water softener tanks. It is recognized that many aspects of the present invention can be applied to other types of fluid treatment systems, such as filtering or de-ionizing systems.

Water softeners are known and typically include a raw water source, a treatment tank containing an ion exchange resin, a brine tank containing a brine solution, and a control valve for directing fluids between the source, the tanks and a drain or other output.

Water softening occurs by running water through the ion exchange resin, which replaces the calcium and magnesium cations in the water with sodium cations. As the ion exchange process continues, the resin eventually loses its capacity to soften water and must be replenished with sodium cations. The process by which the calcium and magnesium ions are removed, the capacity of the ion exchange resin to soften water is restored, and the sodium ions are replenished is known as regeneration.

Water treatment systems in homes typically include one treatment tank and one brine tank to handle the relatively low water flow. Larger commercial treatment systems include multiple water softening units (at least one treatment tank and brine tank) to handle the larger volume of water that passes through these systems. The water softening units are connected together such that the plumbing through each of the individual systems is in parallel with the plumbing of the other systems. Each of the plumbing paths includes a control valve that is used to selectively turn a particular branch or path "on" or "off." This allows a user to be able to control the number of the water softening units that are in operation at a given time based on demand for water.

Commercial size treatment systems typically include a centralized controller that continuously monitors the water flow demand and determines the appropriate number of the paths to turn "on" or "off" to service the current demand. A "trip" level flow rate is the maximum flow that a system is designed to handle through each of the paths. By monitoring the total flow rate and dividing it by the trip level flow rate, the controller determines the exact number of units that need to be turned "on." Typically, the treatment tanks in such systems are designed to be the same size so that each tank can handle the same "trip" level amount of water flow.

A problem occurs in such systems when there is a relatively low water flow. Specifically, if the water flows too slowly through a resin bed in the brine tank for an extended period of time, "channeling" may occur. Channeling causes the water flow to be unevenly distributed throughout the resin bed, resulting in only a portion of the resin being exposed to the water flow, with the remainder being bypassed. As a result, the resin along the channel becomes exhausted and then allows untreated water to pass through the treatment system.

SUMMARY

The present water softening system directs water flow into one or more larger treatment tanks when the flow rate of the water is greater than a designated flow rate and directs the water flow into a smaller treatment tank when the flow rate of the water is equal to or less than the designated flow rate.

Specifically, the present water softening system includes a first treatment tank having a first water capacity, a second treatment tank in parallel to the first treatment tank, having a second water capacity that is less than the first water capacity, a flow meter connected to the first and second treatment tanks, the flow meter configured to determine a demand flow rate of water entering the system and a controller in communication with the flow meter, the controller configured to direct the water into the first treatment tank when the demand flow rate is greater than a designated flow rate, and direct the water into the second treatment tank when the demand flow rate is equal to or less than the designated flow rate.

Another embodiment of the present water softening system includes a plurality of first treatment tanks, each having a first water capacity, a second treatment tank having a second water capacity that is less than the first water capacity, a flow meter connected to at least one of the first treatment tanks and second treatment tank, the flow meter configured to determine a demand flow rate of water entering the system and a controller in communication with the flow meter, the controller configured to direct the water into one of the first treatment tanks when the demand flow rate is greater than a first designated flow rate, to direct the water into the second treatment tank when the demand flow rate is equal to or less than the first designated flow rate and to direct the water into a plurality of the first treatment tanks when the demand flow rate is greater than a second designated flow rate, wherein the second designated flow rate is greater than the first designated flow rate.

A further embodiment provides a method of controlling a water treatment system that includes providing a first treatment tank having a first water capacity and a second treatment tank having a second water capacity that is less than the first water capacity, directing water into the first treatment tank when a flow rate of the water is greater than a designated flow rate and directing the water into the second treatment tank when the demand flow rate is equal to or less than the designated flow rate.

DETAILED DESCRIPTION

Figure 1:
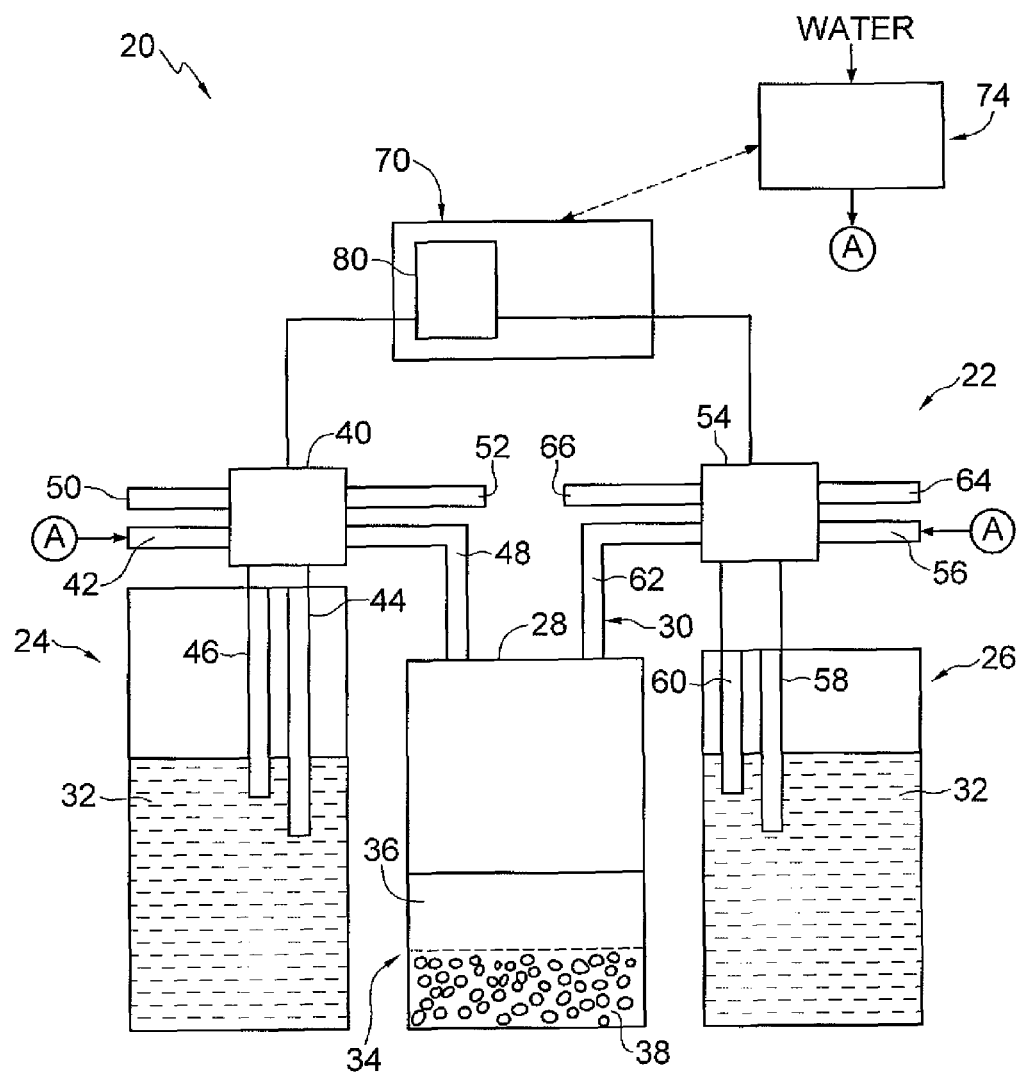
FIG. 1 is a schematic diagram of a water softening system utilizing the present system for controlling multiple sized water softener tanks.
Figure 2:
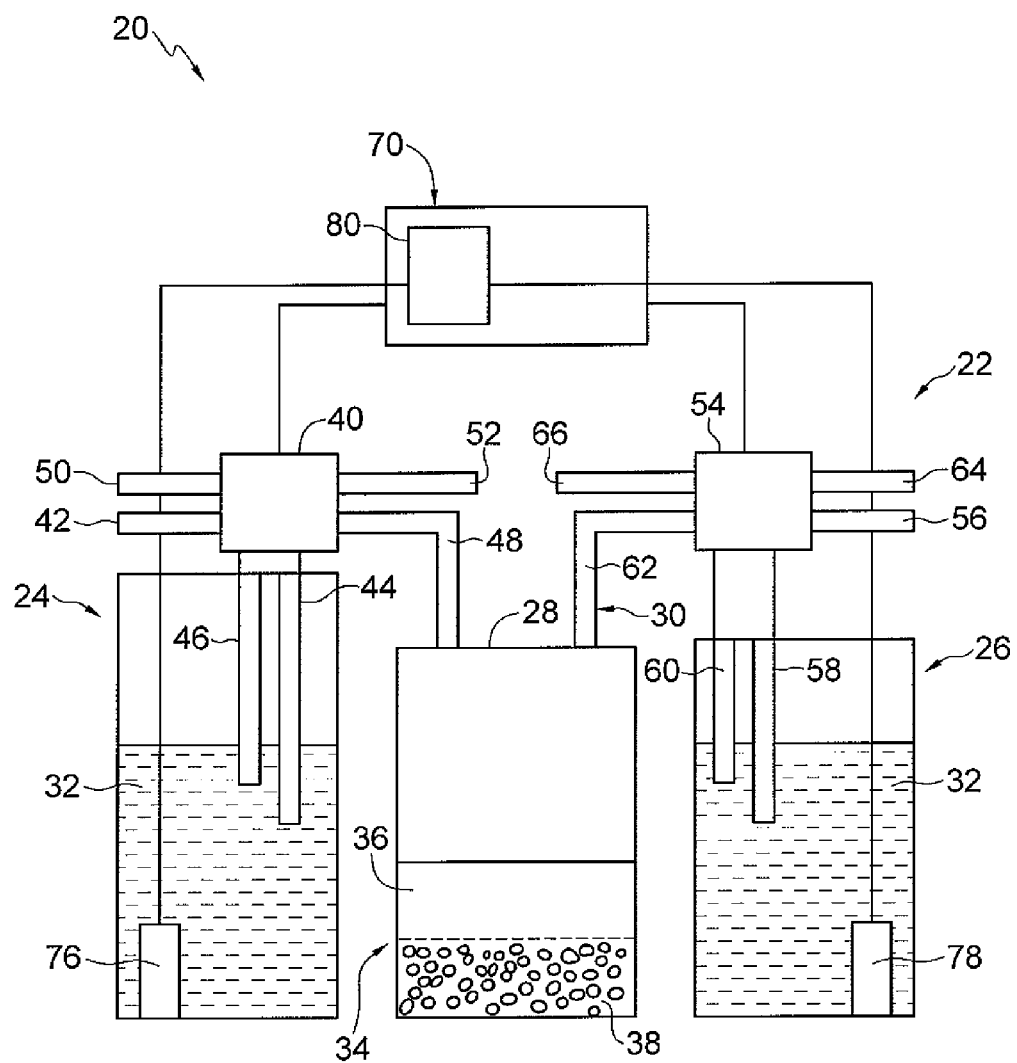
FIG. 2 is a schematic diagram of a water softening system utilizing the present system for controlling multiple sized water softener tanks including a flow meter for each water treatment tank.

Referring to FIGS. 1 and 2, the present water softening system is used to control multiple size water softener tanks and is generally designated 20 and is configured for use with a water softener 22 which includes at least one first treatment tank 24 and a second treatment tank 26 each independently connected to a brine tank 28 using piping 30. As known in the art, the first and second treatment tanks 24, 26 are filled with an ion exchange resin 32 respectively, and the brine tank 28 is filled with a brine solution 34 including water 36 and salt granules 38.

The first treatment tank 24 has a first water capacity and includes a first valve assembly 40 configured for controlling the water flow between a first raw water inlet 42, a first treatment tank inlet 44, a first treatment tank outlet 46, a first brine tank inlet/outlet 48, a first bypass outlet 50 for supplying water to the residence or commercial structure and a first drain 52.

The second treatment tank 26 includes a second water capacity that is less than the first water capacity of the first treatment tank 24 and includes a second valve assembly 54 configured for controlling the water flow between a second raw water inlet 56, a second treatment tank inlet 58, a second treatment tank outlet 60, a second brine tank inlet/outlet 62, a second bypass outlet 64 for supplying water to the residence or commercial structure and a second drain 66. The specific operations of the valve assemblies are described and commonly known in co-pending U.S. application Ser. No. 12/242,287, entitled "Control Valve for a Fluid Treatment System" filed Sep. 30, 2008, and herein incorporated by reference in its entirety.

At least one flow meter 74 is connected to the piping leading to the first and second treatment tanks 24, 26 and measures the number of gallons per unit time that flow through the water softening system 20. The flow meter 74 is configured to measure and communicate the number of gallons of water per unit time flowing through the system to the controller 70. Alternatively, a first flow meter 76 may be provided on the first treatment tank 24 and a second flow meter 78 may be provided on the second treatment tank 26 where the first flow meter 76 measures the number of gallons per unit time that flow through the first treatment tank 24 and the second flow meter 78 measures the number of gallons per unit time that flow through the second treatment tank 26. In this embodiment, the first and second flow meters 76, 78 are each configured to communicate with the controller 70.

As shown in FIG. 1, the controller 70 includes a primary circuit board 80 in communication with the flow meter 74, which in turn is connected to the first and second treatment tanks 24, 26. The first and second valve assemblies 40, 54 are also electrically connected to the controller 70 and are accordingly also in communication with the primary circuit board 80.

During operation of the water softening system 20, the flow meter 74 determines the number of gallons per unit time that flows through the system, which is the demand flow rate. The demand flow rate is communicated to the controller 70, which in turn, determines whether to direct the incoming water into the first treatment tank 24, which has a larger water capacity and thereby can handle a larger water flow rate, or to the second treatment tank 26, which has a second water capacity that is less than the water capacity of the first treatment tank 24, and which handles a lower water flow rate. Specifically, the controller 70 is programmed to include at least a "high trip point" and a "low trip point." The "high trip point" is a designated flow rate that is established as the maximum flow rate intended to pass through the first treatment tank 24. The "low trip point" is a designated flow rate that is established as the maximum flow rate intended to pass through the second treatment tank 26. Thus, the controller 70 directs the incoming water through the first treatment tank 24 when the demand flow rate is greater than the low trip point, and through the second treatment tank 26 when the demand flow rate is equal to or below the low trip point. In effect, the controller turns the first treatment tank 24 "on" and turns the second treatment tank 26 "off" when the demand flow rate exceeds the low trip point. Additionally, the controller 70 turns the first treatment tank 24 "off" and turns the second treatment tank 26 "on" when the demand flow rate is equal to or below the lower trip point. This allows the water softening system 20 to operate efficiently and helps to prevent water channeling which could result in large numbers of gallons of untreated water passing through the system.

Figure 3:
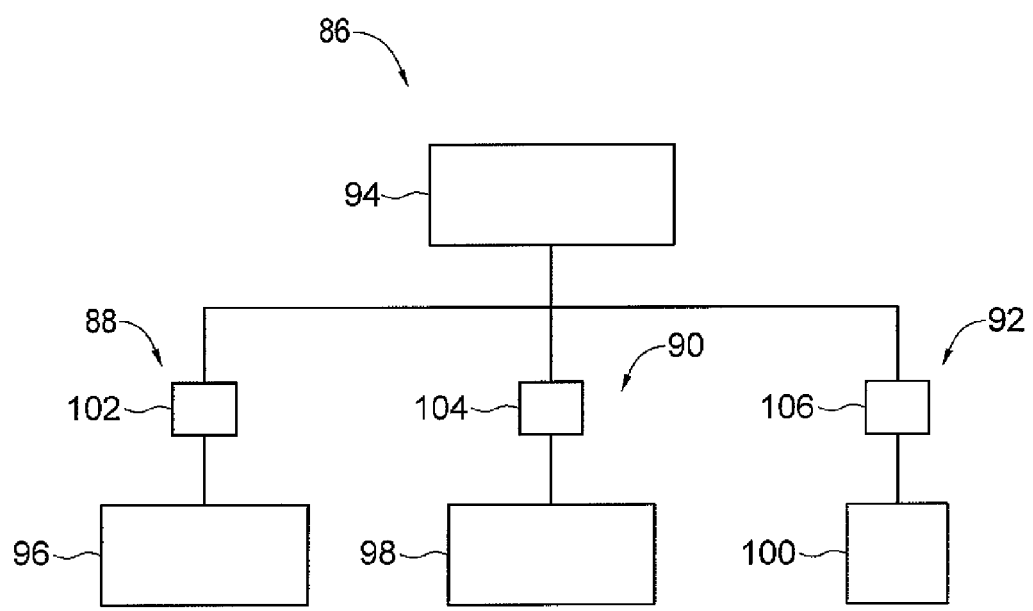
FIG. 3 is a schematic diagram showing an embodiment of the present system that includes two water treatment branches each including a relatively large water treatment tank and one water treatment branch including a relatively small water treatment tank.

Referring now to FIG. 3, another embodiment of a water softening system is shown at 86, including multiple water treatment paths or branches such as a first water treatment branch 88, a second water treatment branch 90 and a third water treatment branch 92, each having one treatment tank. The water treatment branches allow the water softening system 86 to adapt to large water demands or a water demand that fluctuates between high and low flow rates. In the system shown in FIG. 3, a controller 94 is electronically connected to each of the three different water treatment branches 88, 90 and 92. The first branch 88 includes a relatively large water treatment tank 96, the second branch 90 includes a relatively large water treatment tank 98 having the same water capacity as the first water treatment tank 96. The third branch 92 includes one relatively small water treatment tank 100 that has a water capacity that is less than the water capacities of the treatment tanks 96 and 98 in the first and second branches 88, 90. The water treatment tanks 96, 98 in the first and second branches 88, 90 may be the same volume size or different sizes. Furthermore, the present water treatment system may have one or a plurality of branches each including a relatively large water treatment tank.

Preferably as shown in FIG. 3, the individual treatment tanks in each of the branches 88, 90 and 92 are connected together such that the plumbing through each of the branches is parallel with the plumbing of the other branches. Each of the parallel plumbing branches 88, 90 and 92 are constructed with a switched control valve or blocking device 102, 104 and 106, which can be used to turn an individual branch "on" or "off." The controller 94 continually monitors the water flow demand into the system and determines the appropriate number of branches to turn "on" or "off" to service the current water demand level. For example, when there is a relatively high water demand flow rate that exceeds the flow rate or water capacity of the smaller treatment tank 100 in the third water treatment branch 92, the controller 94 directs the water through the first branch 88, the second branch 90 or both the first and second branches.

In this system, a "trip level" or designated flow rate is determined based on the maximum flow rate that the water softening system 86 is designed to handle through any one of the first or second water treatment branches 88, 90. By dividing the current water demand level by the trip level amount, the controller 94 determines the exact number of water treatment branches that will needed to be turned "on" to handle such a level. Thus each of the water treatment branches 88, 90 are designed to handle the same trip level amount of water flow. When the demand flow rate is equal to or less than that "trip level" (i.e., designated flow rate), the controller directs the water through the smaller treatment tank 100 in the third water treatment branch 92. More specifically, the controller 94 sends a signal to the blocking device 106 associated with the smaller treatment tank 100 to turn water treatment tank 98 "on" and also sends signals to the blocking devices 102, 104 associated with branches 88, 90 to turn those branches "off," i.e., prevent water from flowing through the water treatment tanks in those branches. In this way, the water is directed through the third water treatment branch 92, which handles lower water flow rates.

Alternatively, if the demand flow rate exceeds the "trip level," the controller 94 directs the water through at least one of the first and second water treatment branches 88, 90. The controller 94 therefore sends signals to the blocking devices 102, 104 of the first and second branches to turn these branches "on," i.e., allow water to flow through one or more of the water treatment tanks 96, 98 in these branches, and to turn the non-used branch, i.e., the third water treatment branch, "off" to block or prevent water from flowing through this branch. This will direct the water flow through the first and/or second branches 88, 90, which each handle water at higher or greater flow rates.

In an embodiment, the controller is programmed with both a "high trip point" and a "low trip point." The high trip point is a designated maximum flow rate that is intended to pass through any one of the treatment branches 88, 90. The low trip point is a maximum designated flow rate that is intended to pass through the smaller treatment tank 100 in the third water treatment branch 92. When the demand flow rate measured by a flow meter 108 connected to the water softening system 86 and communicated to the controller 94 is equal to or less than the low trip point, all of the water flow is directed through the smaller treatment tank 100 in the third water treatment branch 92. When the demand flow rate exceeds the low trip point, the controller 94 signals the blocking device 106 associated with the smaller treatment tank 100 to turn it "off" and directs the entire water flow to pass through the first and/or second branches 88, 90 having the relatively large treatment tanks 96, 98.

In the above embodiments, the controller 70, 94 may also be programmed to determine when one or more of the treatment tanks are in a regeneration mode and temporarily unavailable to process water. In such a situation, the controller 70, 94 directs the water flow through another branch. In this way, the controller 70, 94 minimizes any downtime or delay in treating the water when a treatment tank is in a regeneration mode.

It is also contemplated that the water softening systems 20, 86 may have one or more smaller treatment tanks or second treatment tanks 100 so that when one smaller water treatment tank is in a regeneration mode, another similarly sized treatment tank is available to handle the water flow. It should be appreciated that the present system may have any suitable number of treatment tanks.

While particular embodiments of the present water softening system have been described herein, it will be appreciated by those skilled in the art that changes and modifications may be made thereto without departing from the invention in its broader aspects.

What is claimed is:

1. A water softening system comprising: a first treatment tank filled with ion exchange resin having a first water capacity; a second treatment tank filled with ion exchange resin connected in parallel with said first treatment tank and having a second water capacity that is less than said first water capacity; at least one flow meter configured to determine a demand flow rate of water entering the system; and a controller in communication with said at least one flow meter, said controller configured to direct the water into said first treatment tank and to block flow into said second treatment tank when said demand flow rate is greater than a designated flow rate, and to direct the water into said second treatment tank and to block flow into said first treatment tank when said demand flow rate is equal to or less than said designated flow rate.

2. The water softening system of claim 1, further comprising at least one additional treatment tank having a water capacity equal to said first treatment tank, wherein said controller is configured to direct the water into at least one of said first treatment tank and said additional treatment tank when said demand flow rate is greater than said designated flow rate.

3. The water softening system of claim 1, further comprising at least one additional treatment tank having a water capacity equal to said first treatment tank, wherein said controller is configured to direct the water into said first treatment tank when said demand flow rate is greater than said designated flow rate and said additional treatment tank is in a regeneration mode, and to direct the water into said additional treatment tank when said demand flow rate is greater than said designated flow rate and said first treatment tank is in a regeneration mode.

4. The water softening system of claim 1, wherein said designated flow rate is a maximum flow rate intended to flow through said second treatment tank.

5. A water softening system comprising: a plurality of first treatment tanks each filled with ion exchange resin, each having a first water capacity; a second treatment tank filled with ion exchange resin having a second water capacity that is less than said first water capacity; at least flow meter configured to determine a demand flow rate of water entering the system; and a controller in communication with said at least one flow meter, said controller configured to direct the water into one of said first treatment tanks and to block flow into said second treatment tank when said demand flow rate is greater than a first designated flow rate, to direct the water into said second treatment tank and to block flow into said first treatment tanks when said demand flow rate is equal to or less than said first designated flow rate and to direct the water into a plurality of said first treatment tanks and to block flow into said second treatment tank when said demand flow rate is greater than a second designated flow rate, wherein said second designated flow rate is greater than said first designated flow rate.

6. The water softening system of claim 5, further comprising a first flow meter connected to said plurality of first treatment tanks and a second flow meter connected to said second treatment tank, wherein said controller is in communication with said first flow meter and said second flow meter and directs the water into at least one of said first treatment tanks when a flow rate determined by said first flow meter is greater than a demand flow rate and directs water into said second treatment tank when a flow rate determined by said second flow meter is less than said demand flow rate.

7. The water softening system of claim 5, wherein said controller is configured to determine if any of said first treatment tanks are in a regeneration mode and direct the water into at least one of said first treatment tanks when said demand flow rate is greater than said designated flow rate and said at least one of said first treatment tanks is not in a regeneration mode.

8. The water softening system of claim 5, wherein said designated flow rate is a maximum flow rate intended to flow through said second treatment tank.

9. The water softening system of claim 5, wherein said first water flow rate capacities of at least two of said first treatment tanks are different.

10. The water softening system of claim 5, wherein said controller is configured to determine a number of said first treatment tanks to turn "on" by dividing said demand flow rate by said second designated flow rate.

11. A method of controlling a water treatment system comprising: providing a first treatment tank filled with ion exchange resin having a first water capacity and a second treatment tank filled with ion exchange resin having a second water capacity that is less than said first water capacity; directing water into said first treatment tank and blocking flow into said second treatment tank when a flow rate of the water is greater than a designated flow rate; and directing the water into said second treatment tank and blocking flow into said first treatment tank when said demand flow rate is equal to or less than said designated flow rate.

12. The method of claim 11, further providing at least one additional first treatment tank, each of said additional first treatment tanks having said first water capacity.

13. The method of claim 12, which includes directing said water into at least one of said first treatment tanks when said flow rate of the water is greater than said designated flow rate and said at least one of said first treatment tanks is not in a regeneration mode.

14. The method of claim 11, further providing at least one additional first treatment tank, each of said additional first treatment tanks having said first water capacity, wherein said first water capacities of at least two of said first treatment tanks are different.

* * * * *